United States Patent
Beck

(10) Patent No.: US 7,370,849 B2
(45) Date of Patent: May 13, 2008

(54) SELF-PUMPING HYDROPNEUMATIC SPRING STRUT UNIT

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 239 days.

(21) Appl. No.: 11/240,345

(22) Filed: Sep. 30, 2005

(65) Prior Publication Data

US 2006/0071377 A1    Apr. 6, 2006

(30) Foreign Application Priority Data

Oct. 1, 2004    (DE)    ...................... 10 2004 047 898

(51) Int. Cl.
*B60G 17/00*    (2006.01)

(52) U.S. Cl. ................................ 267/64.17; 267/64.14; 267/DIG. 2; 188/313

(58) Field of Classification Search ............ 267/64.17, 267/64.16, 64.14, DIG. 2; 188/313, 316
See application file for complete search history.

(56) References Cited

U.S. PATENT DOCUMENTS

| | | | |
|---|---|---|---|
| 3,658,313 A * | 4/1972 | Hahn | ....................... 267/64.17 |
| 3,837,444 A | 9/1974 | Allinquant et al. | |
| 3,904,183 A * | 9/1975 | Allinquant et al. | ...... 267/64.17 |
| 4,657,228 A * | 4/1987 | Lautzenhiser | ............ 267/64.15 |
| 5,217,212 A * | 6/1993 | Chorkey et al. | ............ 267/226 |
| 6,202,993 B1 | 3/2001 | Wilms et al. | |
| 6,494,442 B2 * | 12/2002 | Beck et al. | ............... 267/64.17 |

FOREIGN PATENT DOCUMENTS

DE    198 57 595    10/1999

* cited by examiner

*Primary Examiner*—Melanie Torres
(74) *Attorney, Agent, or Firm*—Cohen Pontani Lieberman & Pavane LLP

(57) ABSTRACT

A self-pumping hydropneumatic spring strut unit includes a working cylinder filled with oil under pressure and a piston and rod unit displaceable in the cylinder so as to define two working spaces in the cylinder, and high-pressure and low pressure chambers surrounding the cylinder. The strut unit further has a piston pump operable to transport a working medium from the low-pressure chamber into the one working space which is in flow communication with the high-pressure chamber. The piston pump has a cylinder defined by the inner surface of the piston rod unit, and a hollow pump rod coupled to the working cylinder and having a flow channel in communication with the low-pressure chamber. The flow channel has a deregulating opening on the working space and a throttle in flow communication with the deregulating opening. A filter device protects the throttle from impurities carried by the oil during flow from the deregulating opening to the low pressure chamber.

6 Claims, 3 Drawing Sheets

SELF-PUMPING HYDROPNEUMATIC SPRING STRUT UNIT

BACKGROUND OF THE INVENTION

1. Field of the Invention

The invention pertains to a self-pumping hydropneumatic spring strut unit with internal level control, especially for motor vehicles. In particular, the invention relates to a MacPherson type strut having a deregulating opening, which can be closed as a function of the position of a working piston in a working cylinder.

2. Description of the Related Art

MacPherson strut units of this type are already known (U.S. Pat. No. 6,202,993), in which the working cylinder is divided into two working spaces by a working piston carried by a hollow piston rod and in which the hollow piston rod forms a pump cylinder, where a pump rod moves back and forth inside this pump cylinder to form a piston pump. The hydraulic piston pump is in continuous operation while the vehicle is being driven, so that the movements of the vehicle axle and of the piston rod attached to it caused by irregularities in the pavement transport oil continuously to the working cylinder. The piston rod is pushed outward until a bypass control establishes the dynamic level. Once this position is reached, the unit cannot be pumped up any further. When the vehicle is unloaded, the vehicle body first travels outward until a deregulating opening in the pump rod establishes a connection between the working cylinder, in which high pressure is present, and the low-pressure space. The disadvantage here is that a deregulating opening in this position also has a throttling function to prevent the level of the unloaded vehicle from sinking too quickly and to prevent too much pressure from being lost while the vehicle is being driven. This results in the danger that the oil flowing back from the high-pressure chamber via the deregulating opening to the low-pressure chamber can plug the deregulating opening, which renders the hydropneumatic MacPherson strut unusable.

SUMMARY OF THE INVENTION

An object of the invention is therefore to create a simple, reliable, and rugged level control system, in which the deregulating opening cannot be plugged by dirt particles in the oil.

To accomplish this object, a filter device is provided in the flow connection between the working space and the throttle.

In this embodiment, it is advantageous that the oil flowing back from the high-pressure chamber via the deregulating opening to the low-pressure chamber cannot clog the deregulating opening, beyond which it is also guaranteed that, when the overload valve is opened, the oil can flow back through the bore of the pump rod into the low-pressure chamber without being throttled. At the same time, the bore in the pump rod continues to be used in the opposite direction to pump up the strut unit.

In accordance with another embodiment, the deregulating opening opens out into the flow connection, the filter device being positioned between the terminal part of the flow connection and the throttle.

In another embodiment, the medium can flow on only one side through the flow connection.

According to another favorable embodiment, the flow connection is coaxial with respect to the center axis of the pump rod.

According to an essential feature, a disk-shaped element is provided as the filter device. Alternatively, the filter device is in the form of a circular ring and is coaxial to the center axis of the strut unit.

According to another embodiment, at least part of the filter device is cylindrical. It is advantageous for the filter device to be made of sintered material or of a plastic- and/or steel woven cloth.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
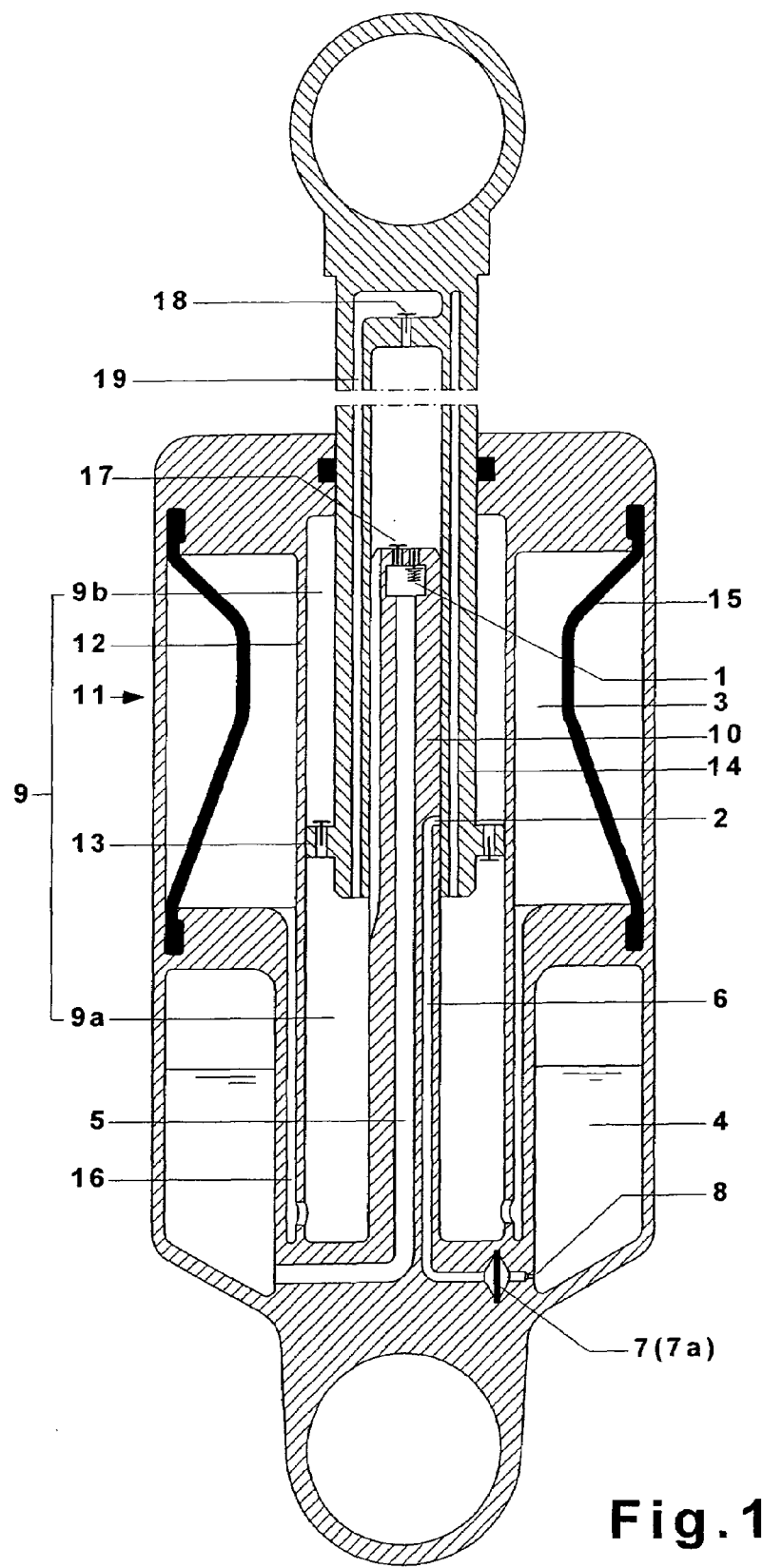
FIG. 1 shows a cross section of a self-pumping hydropneumatic MacPherson strut unit with internal level control.

The self-pumping strut unit 11 with internal level control for motor vehicles shown in FIG. 1 includes a working cylinder 12 in which a working piston 13 slides, the piston being mounted at the end of a piston rod 14. The working cylinder 12 is closed off at one end by a bottom piece and at the other end by a cover, through which the piston rod 14 passes in a sealed manner to the outside. The bottom piece and the piston rod are fastened in a manner not shown by fastening elements to the body of the vehicle and to the axle. The working cylinder 12 is surrounded by a ring-shaped compensating chamber, partially filled with oil and partially with gas; this chamber is divided by a partition wall into a high-pressure chamber 3 and a low-pressure chamber 4. The high-pressure chamber 3 is divided by a diaphragm 15 into an oil space and a gas space. Oil and a low-pressure gas cushion are present in the low-pressure chamber 4; the oil and the gas are not separated from each other. The oil level is shown in broken line in FIG. 2. In the completely deregulated state, that is, in the non-pumped-up state, the pressure prevailing in the low-pressure chamber 4 is the same as that in the high-pressure chamber 3. The working space 9a at the end between the working piston 13 and the bottom piece is connected to the oil space of the high-pressure chamber 3 by a channel 16. The working space 9b at the end between the working piston 13 and the cover cooperates by way of valves in the working piston 13 with the working space 9a of the working cylinder 12. The pump rod 10 cooperates with the hollow space in the piston rod 14 to form a pump cylinder, which forms an oil pump. The movements of the vehicle axle and of the piston rod 14 attached to it caused by irregularities in the pavement actuate this oil pump, which transports oil continuously, under the control of the upstroke valve 17, from the low-pressure chamber 4, via the pressure valve 18 and the channel 19, into the working cylinder 12. As a result, the working piston 13 and the piston rod 14 are pushed outward until the bypass control establishes the dynamic level. When the vehicle is unloaded, the vehicle body first travels outward until the deregulating opening 2 in the pump rod 10 establishes a connection between the working space 9a, in which high pressure is present, and the low-pressure chamber 4. Thus the deregulating function begins.

The pump rod 10 is also provided with an overload valve 1, which opens when the vehicle is extremely overloaded. This allows the pump volume to be conveyed through the bore 5 of the pump rod 10 to the low-pressure chamber 4. The overload valve 1 protects the MacPherson strut unit 11 from the damage which could be caused by pressure. It is also evident that the vehicle is extremely overloaded when the level height can no longer be reached while the vehicle is being driven.

A flow connection 6 starts from the deregulating opening 2 and extends parallel to the bore 5 of the pump rod 10 before reaching the bottom area of the MacPherson strut unit. A filter device 7 is located in this flow connection 6, a throttle 8 being positioned between the filter device 7 and the low-pressure chamber 4. As a result of this arrangement, dirt particles in the oil which can pass easily through the relatively large deregulating opening 2 and the adjacent flow connection 6 are prevented by the filter device 7 from arriving at the throttle 8 and possibly clogging it under certain conditions. The medium flows only in this direction through the flow connection 6, so that any dirt particles which may have been filtered out cannot flow back or return to the oil circuit.

Figure 2:
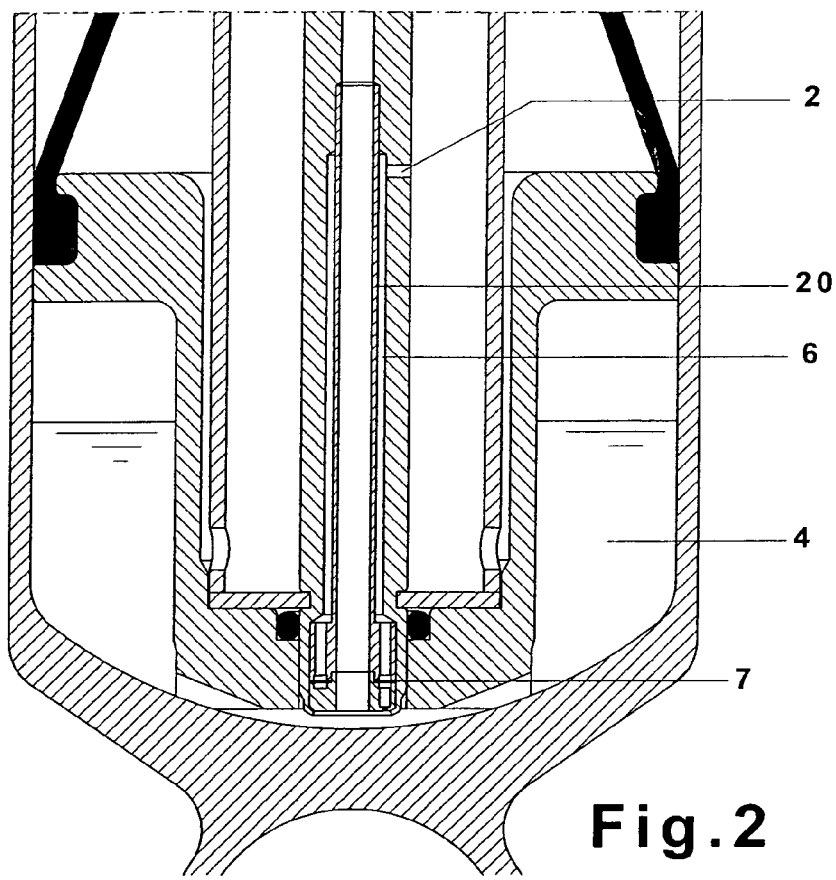
FIG. 2 shows a cross section of an embodiment of a flow connection.

FIG. 2 shows a variant in which the deregulating opening 2 leads to the flow connection 6, where a sleeve 20 is used to make the flow connection 6 in the form of a ring-shaped space.

Figure 3:
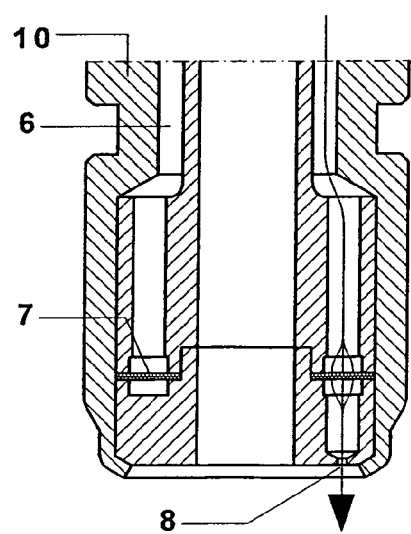
FIGS. 3-6 show cross sections of various embodiments of a filter device.
Figure 4:
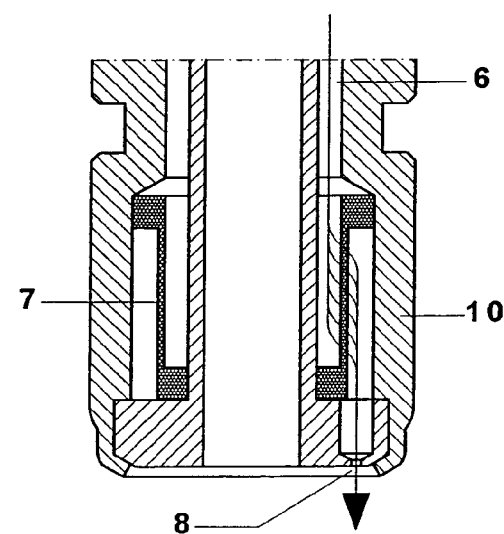

The filter device 7, which is shown as a separate detail in FIGS. 3 and 4, is located in the lower part of the flow connection 6 of the embodiment shown in FIG. 2.

In FIG. 3, the filter device 7 is designed with an annular filter element, which is coaxial to the center axis of the pump rod 10. The flow connection 6 is again designed as a ring-shaped flow channel which is coaxial to the bore 5. The flow connection 6 in the form of a ring-shaped flow channel terminates at the throttle 8, which, according to FIG. 2, then opens out into the low-pressure chamber 4.

FIG. 4 shows another embodiment of a ring-shaped flow connection 6. The filter device 7 in this embodiment is a sleeve-like device, the tubular filter element of which is made of plastic- and/or steel woven cloth, where the two end surfaces are designed with thicker shapes to help hold it in the pump rod 10. This design offers an increased filter surface area in comparison with the ring-shaped design of FIG. 3; the filtration fineness of all the variants shown, however, should always be chosen in such a way that the smallest dirt particles in the oil which are of a size which can plug the deregulating opening 8 will be filtered out by the filter device 7.

Figure 5:
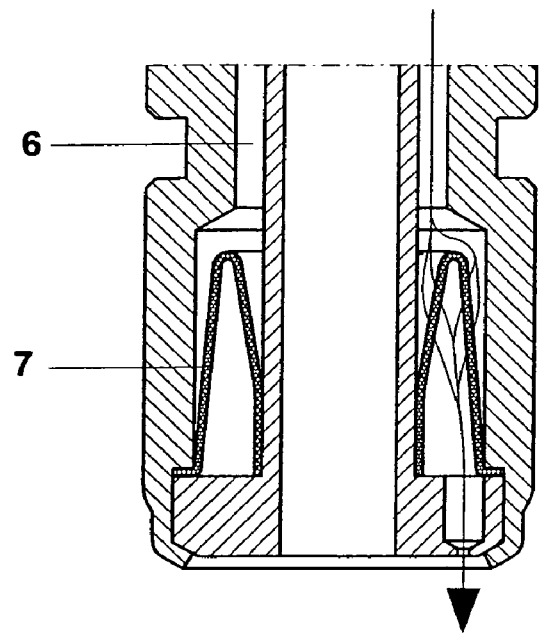

To increase the surface area of the filter even more, a cup-shaped filter device 7 is provided according to FIG. 5, which is positioned in the flow connection 6 and provides a corresponding increase in the filter surface area.

Figure 6:
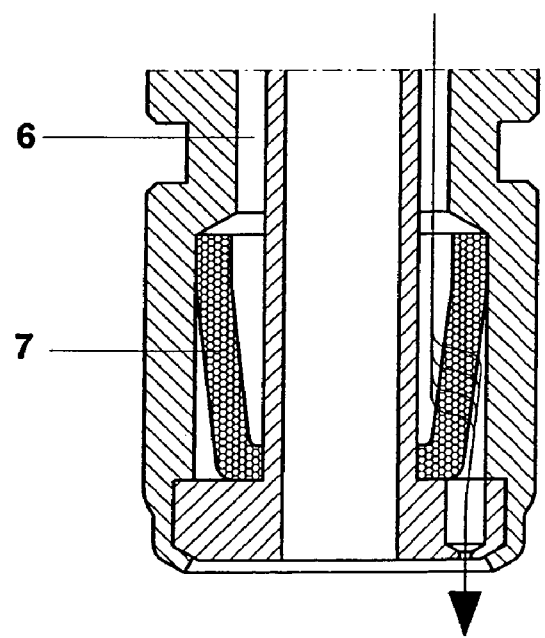

Another variant of a filter device is shown in FIG. 6. This device could be made of a sintered material, for example. The material of the sintered filter can be pressed to varying degrees, so that filters with different degrees of fineness can be installed in the flow connection 6. Other known filter materials, of course, can also be used in this MacPherson strut unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic spring strut unit with internal level control, the unit comprising:
   an oil-filled working cylinder having therein a piston dividing the cylinder into a first working space and a second working space, the piston being carried by a hollow piston rod;
   a high pressure chamber having therein a gas cushion which pressurizes oil in the first working space;
   a low pressure chamber;
   a piston pump driven by spring movements to transport oil from the low pressure chamber to the first working space, the pump comprising the hollow piston rod and a hollow pump rod fixed to the working cylinder, the pump rod having a distal end received in the hollow piston rod and a central bore connecting the low pressure chamber to the distal end, the bore having an upstroke valve at the distal end;
   a flow channel connecting the low pressure chamber to the first working space as a function of position of the working piston in the working cylinder, the flow channel extending into the piston rod coaxially to the central bore and having a deregulating opening on the first working space and a throttle toward the low pressure chamber, the deregulating opening closing as the hollow piston rod moves into the working cylinder; and
   a filter in the flow channel between the deregulating opening and the throttle, the filter being coaxial to the central bore.

2. The self-pumping strut unit of claim 1 wherein the piston pump is configured to provide flow of oil through the flow channel only in a direction toward the low pressure chamber.

3. The self-pumping strut unit of claim 1 wherein the filter device comprises an annular filter element.

4. The self-pumping strut unit of claim 1 wherein the filter device comprises a tubular filter element.

5. The self-pumping strut unit of claim 1 wherein the filter device comprises a sintered material.

6. The self-pumping strut unit of claim 1 wherein the filter device comprises a woven cloth made of at least one of steel and plastic.

* * * * *